United States Patent [19]
Savage et al.

[11] Patent Number: 5,724,043
[45] Date of Patent: Mar. 3, 1998

[54] VARIABLE FREQUENCY MICROWAVE TROPOPAUSE SENSOR SYSTEM AND METHOD

[75] Inventors: Richard C. Savage, Franktown, Colo.; James L. Peirce, Hermosa Beach, Calif.

[73] Assignee: Hughes Aircraft Company, Los Angeles, Calif.

[21] Appl. No.: 509,620

[22] Filed: Jul. 31, 1995

[51] Int. Cl.$^6$ .................................................. G01S 3/02
[52] U.S. Cl. .................................. 342/351; 356/216
[58] Field of Search ................. 342/351; 356/216; 376/121

[56] References Cited

U.S. PATENT DOCUMENTS

| | | | |
|---|---|---|---|
| 3,129,330 | 4/1964 | Selling | 342/351 |
| 3,359,557 | 12/1967 | Fow et al. | |
| 3,380,055 | 4/1968 | Fow et al. | |
| 3,465,339 | 9/1969 | Marner | |
| 3,665,467 | 5/1972 | Haroules et al. | |
| 3,883,876 | 5/1975 | Roeder et al. | 343/117 R |
| 3,935,460 | 1/1976 | Flint | |
| 4,463,357 | 7/1984 | MacDoran | |
| 4,522,356 | 6/1985 | Lair et al. | 244/3.15 |
| 4,527,162 | 7/1985 | Strickland | 343/351 |
| 4,864,309 | 9/1989 | Wiley et al. | 342/351 |
| 4,872,014 | 10/1989 | Nowogrodzki | 342/351 |
| 4,873,481 | 10/1989 | Nelson | |
| 5,117,689 | 6/1992 | Gary | |
| 5,299,869 | 4/1994 | Wissinger | |

OTHER PUBLICATIONS

M.J. Schwartz et al., "Atmospheric Transmittance Measurements Near 54 and 118 GHz", Abstract, Feb. 1994.
Richard F. Harrington et al., "An Airborne Remote Sensing 4.5 to 7.2 Gigahertz Stepped Frequency Microwave Radiometer," Proc. IEEE MTT-S International Microwave Symposium, pp. 543–544 (1979).
G. Sassoon et al., "A 60 GHz Radiometer for Outside Air Temperature," Proc. International Aersoace Instrumentation Symposium, pp. 7.1–7.5 (1992).
J.B. Snider, "A sensitive two-frequency radiometer for remote sensing of temperature profiles", Rev. Sci. Instrum. vol. 45, No. 8, pp. 981–984 (1974).

Primary Examiner—Thomas H. Tarcza
Assistant Examiner—Dao L. Phan
Attorney, Agent, or Firm—G. S. Grunebach; M. W. Sales; W. K. Denson-Low

[57] ABSTRACT

An apparatus for measuring the properties of the tropopause includes a variable frequency microwave radiometer operating over a range of from about 118.0 to about 119.0 GHz. The radiometer receives as an input a frequency selector signal and produces as an output a measured power level at a measurement frequency corresponding to the input frequency selector signal. The apparatus further includes a feedback controller having as an input the measured power level and producing as an output the frequency selector signal. The feedback controller varies the frequency selector signal to a target frequency so as to produce a minimum value in the measured power level. The tropopause equivalent altitude is determined from the target frequency.

15 Claims, 3 Drawing Sheets

VARIABLE FREQUENCY MICROWAVE TROPOPAUSE SENSOR SYSTEM AND METHOD

BACKGROUND OF THE INVENTION

This invention relates to the measurement of the properties of the atmosphere, and, more particularly, to the measurement of properties of the tropopause.

The tropopause is the boundary defined by meteorologists between the troposphere and the stratosphere. The troposphere is that portion of the earth's atmosphere adjacent to the surface of the earth, and is characterized by decreasing temperature with increasing altitude. The stratosphere is that portion of the earth's atmosphere above the tropopause, and is characterized by increasing temperature with increasing altitude. The altitude of the tropopause varies with time and location, but is typically in the range of 10–20 kilometers above the surface of the earth. The temperature of the tropopause also varies with time and location, but is typically in the range of 180° K–215° K.

The earth's jet stream flows in and close to the tropopause. The behavior of the jet stream and other factors influencing the earth's weather are significantly dependant upon the altitude and temperature of the tropopause and their variations with time and location. Accordingly, it is important to understand the exact state and changes in the tropopause as an aid to the understanding and prediction of the weather.

Data on the temperature distribution in the atmosphere was traditionally obtained by sounding rockets, balloons, or other instrumentation placed directly into the atmosphere. These techniques are limited in their ability to obtain data on a regular basis and at a wide range of locations. More recently, infrared and microwave radiometers have been developed to remotely sense atmospheric temperatures, either from earth or from spacecraft orbiting above the atmosphere. In general, such radiometers measure the power radiated in a selected energy band from the concentration of active species within a region of the atmosphere. From the power data and a knowledge of the attenuation properties of the atmosphere, temperatures of the atmosphere can be determined.

Atmospheric radiometers are widely used to produce important weather information, but have shortcomings in their present form. Infrared radiometers cannot measure through overlying cloud cover. Microwave radiometers cannot measure through precipitation. Additionally, microwave radiometers typically operate at a plurality of fixed microwave frequencies, about 60 GHz (gigahertz) in existing systems. About 10–20 channels are used in existing systems, and studies are underway to develop radiometers with as many as 100 channels. The use of multiple channels adds weight, volume, power requirements, and cost to the radiometer system, all of which are undesirable for a radiometer operated in a spacecraft.

There is a need for an improved approach to the measurement of the properties, particularly the equivalent altitude and temperature, of the tropopause. The present invention fulfills this need, and further provides related advantages.

SUMMARY OF THE INVENTION

The present invention provides an apparatus and method for measuring the properties of the tropopause. Both altitude and temperature are determined. The approach is based on microwave radiometry, permitting the measurements to be performed with the instrument at a great distance such as in an orbiting spacecraft. The properties of the tropopause can be measured to within a few hundred feet of altitude and a few degrees of temperature.

In accordance with the invention, an apparatus for measuring the properties of the tropopause comprises a variable frequency microwave radiometer operating over a range of from about 118.0 to about 119.0 GHz. The radiometer receives as a first input a microwave signal and as a second input a frequency selector signal, and produces as an output a measured power level at a measurement frequency corresponding to the input frequency selector signal. The apparatus further includes controller means for varying the frequency selector signal to a target frequency within the range of from about 118.0 to about 119.0 GHz, so as to produce a minimum value in the measured power level at the target frequency. The controller means is preferably a feedback controller having as an input the measured power level and producing as an output the frequency selector signal. The feedback controller is operable to vary the frequency selector signal to a target frequency so as to produce a minimum value in the measured power level. A tropopause equivalent altitude is determined from the target frequency.

The radiometer preferably includes a microwave receiving antenna, an amplifier that receives an output of the antenna, means for filtering an output of the amplifier at the measurement frequency to produce a filtered output, and means for determining the power of the filtered output. In the preferred application, the microwave antenna is mounted on an earth-orbiting platform or other means to permit the antenna to be directed downwardly toward the atmosphere of the earth.

A related method for determining the properties of the tropopause includes the step of measuring the radiated power of a volume of the earth's atmosphere in a region containing the tropopause, at a measurement frequency within the range of from about 118.0 to about 119.0 GHz. The measurement frequency is varied so as to determine the measurement frequency within the range of from about 118.0 to about 119.0 GHz at which the radiated power is a minimum value, the target frequency. A tropopause equivalent altitude is determined from the target frequency. Additionally, the method can include measuring a plurality of radiated power values at a plurality of frequencies within the range of from about 118.0 to about 119.0 GHz, and determining the tropopause temperature from the tropopause equivalent altitude and the plurality of radiated power values.

It is known to build microwave radiometers utilizing a series of discrete frequencies of oxygen molecule microwave emission (absorption) lines within the range of about 50–60 GHz. The power measured by these radiometers is an integrated product of the vertical temperature profile and a weighting function curve. It is not possible to determine the tropopause altitude or temperature from these measurements.

In the present approach, on the other hand, the microwave radiometer is operated close to the oxygen absorption line at 118.75 GHz, and in particular in the range of about 118.0–119.0 GHz. The use of this measurement frequency range, as distinct from the 50–60 GHz range, has several advantages. First, a series of measurements are made at individual filtered measurement frequencies within the 118.0–119.0 GHz range, rather than in relation to a series of oxygen absorption lines as in the 50–60 GHz range, resulting in a less complex, less costly, and lower-power-consumption apparatus. Second, in the microwave frequency range near 118.75 GHz, a monotonic frequency change is associated with a monotonic change in the height of the response function, because there is a single oxygen absorption line. This property simplifies the design of the feedback controller. The monotonic change is not found in the 50–60 GHz microwave frequency range, where there are many oxygen absorption lines. Third, the peaks in the known microwave response functions in the 118.0–119.0 GHz frequency range are found at about the altitudes at which the tropopause is most typically observed, 10–20 kilometers. A relatively small change in frequency can be used as the independent variable in determining the minimum energy emission, corresponding to the minimum temperature, which simplifies instrument construction. This is not the case for the multiple oxygen emission lines in the range of 50–60 GHz, whose microwave response function peaks differ widely in their altitudes and there is interference in measuring the energy changes resulting from varying the measurement frequency, due to the presence of adjacent oxygen absorption peaks.

The present approach provides an advance in the art of the measurement of atmospheric properties. The equivalent altitude and temperature of the tropopause is measured with a remote sensing microwave radiometer that operates in most conditions encountered in tropopause measurements. Other features and advantages of the present invention will be apparent from the following more detailed description of the preferred embodiment, taken in conjunction with the accompanying drawings, which illustrate, by way of example, the principles of the invention.

DETAILED DESCRIPTION OF THE INVENTION

Figure 1:
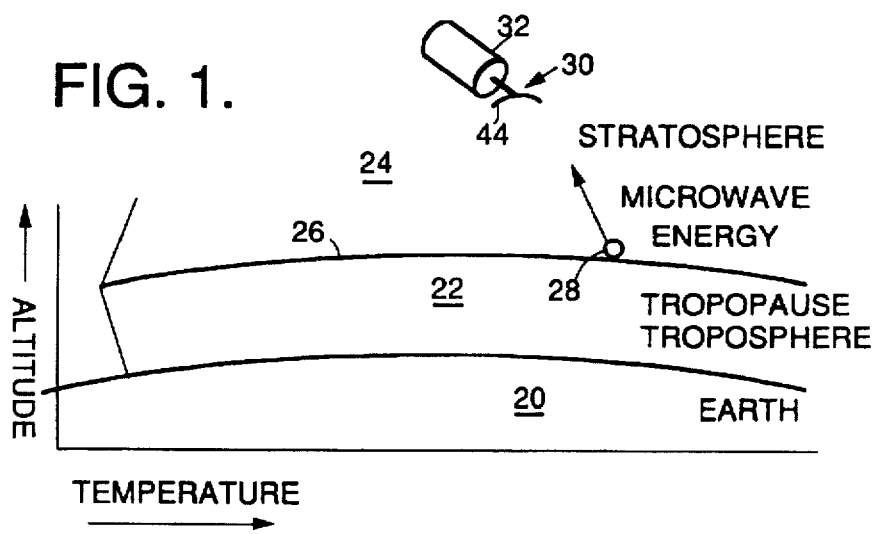
FIG. 1 is a schematic depiction of the measurement of the properties of the tropopause using the approach of the invention.

FIG. 1 schematically depicts the location, characteristics, and measurement of the properties of the tropopause using the present approach. Directly above the surface of the earth 20 is a layer of atmosphere termed the troposphere 22. Above the troposphere 22 is another layer of atmosphere termed the stratosphere 24. The dividing line defined by meteorologists between the troposphere 22 and the stratosphere 24 is the tropopause 26. As shown in the schematic graph on the left-hand side of FIG. 1, the atmospheric temperature gradually decreases with increasing altitude above the surface of the earth in the troposphere 22, reaches a minimum value at the tropopause 26, and then gradually increases with increasing altitude above the surface of the earth in that portion of the stratosphere 24 that is near to the tropopause 26.

The tropopause 26 is therefore characterized by an altitude at which it is located—the altitude where the rate of change of temperature with increasing altitude changes from negative to positive—and a minimum temperature value at that altitude. The tropopause altitude and temperature vary from location to location over the earth's surface, but that variation is relatively slow. The altitude of the tropopause typically varies in the range of 10–20 kilometers above the surface of the earth. The temperature of the tropopause surface typically varies in the range of 180° K–215° K.

The present invention is concerned with the remote measurement of the altitude and the temperature of the tropopause 26. This information, particularly in the form of a map of the altitude and the temperature of the tropopause as a function of position, is useful to meteorologists in understanding and predicting weather.

Both the troposphere and the stratosphere contain oxygen molecules 28. Oxygen molecules radiate energy at a variety of frequencies, including microwave frequencies. The power level of the radiated energy varies with the local temperature and partial pressure of the oxygen. Equivalently, it may be said that the radiated energy varies with local temperature and altitude, inasmuch as the partial pressure of the oxygen varies with altitude in a known manner. Thus, as used herein, "equivalent altitude" means a distance above the surface of the earth or its meteorological equivalent, the corresponding pressure at that altitude.

To obtain the properties of the tropopause, a measurement apparatus 30 is preferably placed on a space platform 32 orbiting above the surface of the earth, such as a satellite in orbit. The use of the orbiting satellite is preferred, because it permits regular mapping of the tropopause properties over an extended period of time. The measurement apparatus can instead be positioned, for example, on the ground, in an aircraft, or in a balloon.

Figure 2:
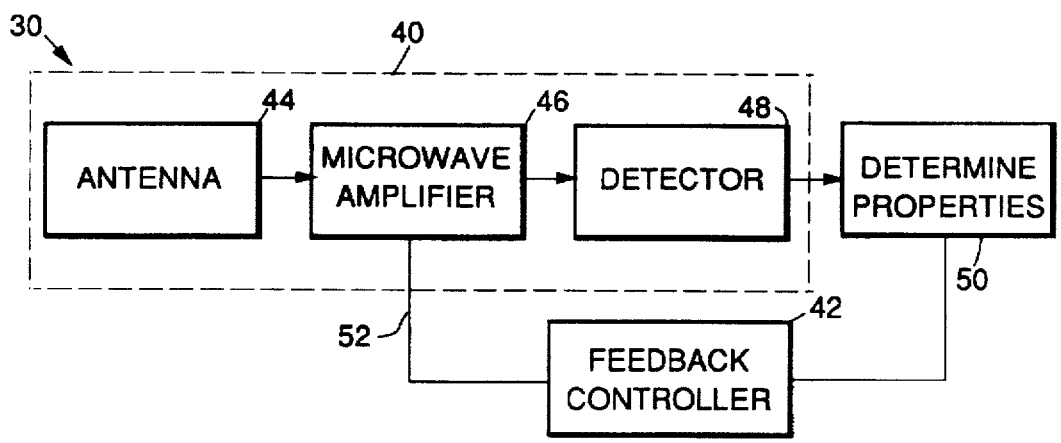
FIG. 2 is a block diagram of the approach of the invention.

As shown in FIG. 2, the apparatus 30 includes a variable-frequency microwave radiometer 40 and a feedback controller 42 that controls the measurement frequency of the radiometer 40. The radiometer 40 includes an antenna 44 directed toward the tropopause 26 so as to receive microwave radiation from the radiating oxygen molecules 28. The antenna 44 may be optimized to receive microwave radiation in the range of about 118.0–119.0 GHz (gigahertz), as the power output in this range is utilized in the present approach. A more general purpose antenna can also be used, as long as it is capable of receiving microwave radiation in the range of about 118.0–119.0 GHz.

The output signal of the antenna 44 is filtered by a variable filter 46 whose output is that component of the antenna signal 44 within a frequency range determined by the feedback controller 42. The filtered signal is detected by a detector 48, which filtered signal is used to determine the properties of the tropopause, numeral 50. In the property determination 50, the power of the signal output of the detector 48 is found by squaring the signal output, and then processed in a manner to be discussed in greater detail subsequently.

The power level as determined at numeral 50 is also used by the feedback controller 42 to adjust the value of an input frequency selector signal 52 provided to the variable filter 46. According to the present approach, the tropopause equivalent altitude is determined from the minimum measured microwave power level, as a function of measurement frequency, within the range of about 118.0 to about 119.0 GHz. To identify a target measurement frequency which produces the minimum measured microwave power level, the feedback controller 42 varies the input frequency selector signal toward the target measurement frequency by any operable technique. The preferred approach is the finite difference technique in which the change in power as a function of frequency is determined, and the frequency is varied so as to reach a zero value of the change in power as a function of frequency (i.e., a zero slope). Equivalently, the feedback controller can be a digital computer programmed to monitor the power level of the filtered antenna output from the determination 50 and adjust the input frequency selector signal 52 so as to reach the minimum value of the power level.

Figure 3:
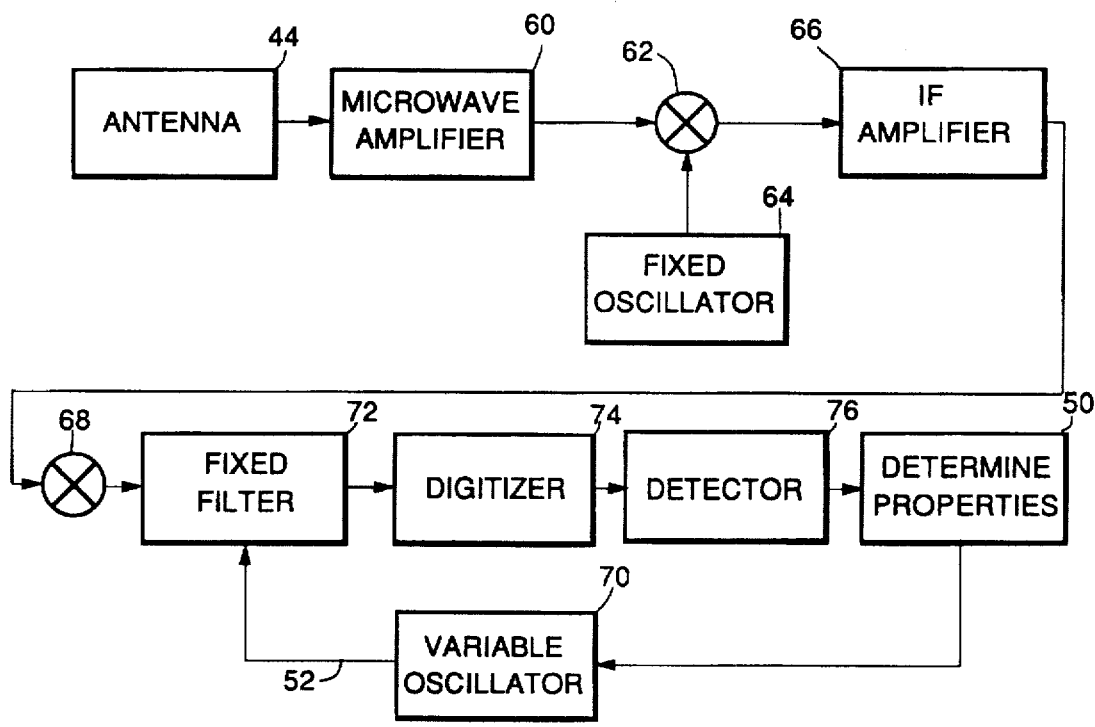
FIG. 3 is a block diagram of a preferred embodiment of the approach of the invention.

The implementation of this approach in practice is complicated by the inability, in the present state of the art, to directly process microwave signals in the 118.0–119.0 GHz range in the manner discussed in relation to FIG. 2. FIG. 3 illustrates the preferred hardware implementation of the processing of the signals, in which the microwave frequency signal is down converted to a lower frequency for processing.

As shown in FIG. 3, the output signal of the antenna 44 is amplified by a microwave-frequency amplifier 60. The amplified signal is down converted, numeral 62, to an intermediate frequency, typically in the 500 MHz (megahertz) range in the present state of the art, using a fixed output oscillator 64. The down-converted signal from the down converter 62 is amplified by an IF amplifier 66 to a level suitable for processing.

There is a further down conversion by a variable down converter 68, using a variable output oscillator 70 whose output serves as the frequency selector signal to the variable down converter 68. The output of the down conversion 68 is filtered by a fixed IF filter 72 to restrict its bandwidth. The output of the fixed filter 72 corresponds to the output of the filter 46 of FIG. 2, with the variable down converter 68 and fixed filter 72 acting together as the filter 46. The output signal of the fixed filter 72 is digitized by a digitizer 74, preferably an analog-to-digital converter, and detected by a detector 76, whose output is provided to the property determination 50.

Figure 4:
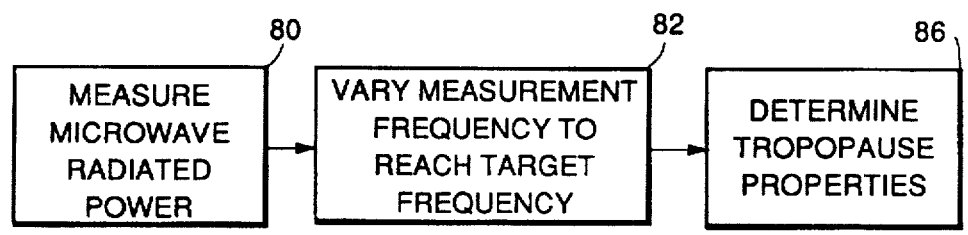
FIG. 4 is a block flow diagram of the method of the invention.

FIG. 4 depicts a method according to the invention. The microwave radiated power is measured, numeral 80, at measurement frequencies within the range of about 118.0–119.0 GHz. The measurement frequency is varied to reach the target frequency within that range that results in the minimum microwave radiated power measurement, numeral 82. The tropopause properties are determined from the measured microwave power information, numeral 84.

Figure 5:
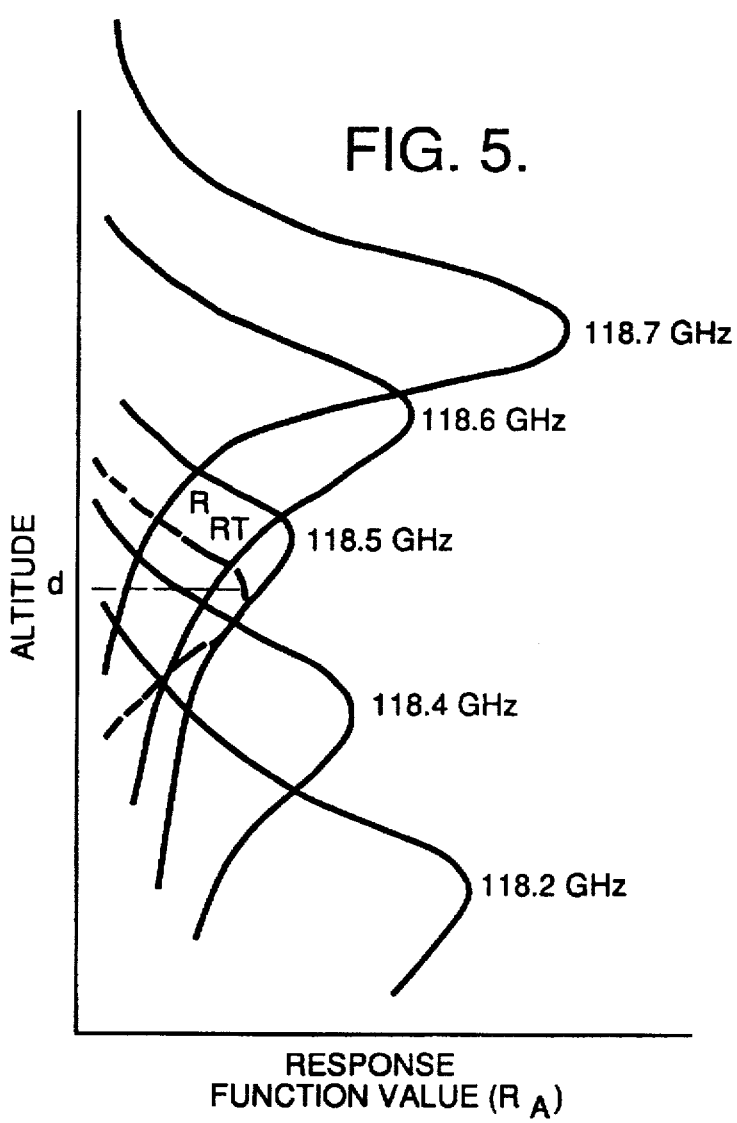
FIG. 5 is a schematic graph of microwave response functions as a function of altitude, for several different microwave frequencies.
Figure 6:
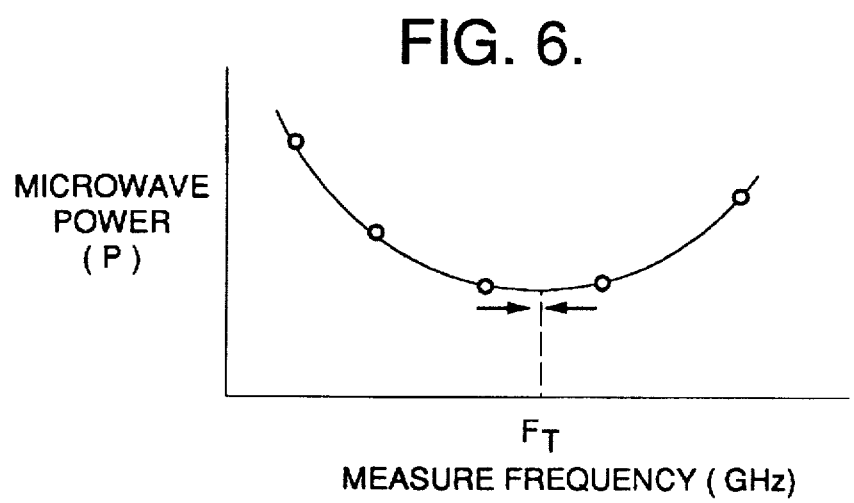
FIG. 6 is a schematic graph of measured microwave power as a function of measurement frequency.

FIG. 5 schematically depicts a series of microwave response functions $R_A$ in the range of 118.0–119.0 GHz, in the conditions of a temperature distribution such as that schematically depicted in FIG. 1. FIG. 6 is a schematic graph of the microwave power P, calculated as the integral of the temperature distribution times the corresponding response function $R_A$ of FIG. 4 for the selected measurement frequency, as a function of measurement frequency. The minimum in this curve of FIG. 6 is the frequency associated with the location (altitude) of the tropopause $F_T$.

The relation between FIGS. 5 and 6 illustrates the underlying basis of the curve of microwave power as a function of frequency, but in practice the microwave power curve of FIG. 6 is determined from the measurements obtained using the radiometer 40 with the frequency varied in the range between about 118.0 and about 119.0 GHz. These measured data points are represented by the circles in FIG. 6, and a curve can be drawn through these data points, as shown. The minimum value in the curve of FIG. 6 is established either using the feedback controller to adjust the frequency to the minimum value, the preferred approach described in relation to FIG. 2, or by curve fitting the experimental points in FIG. 6 and locating the minimum from the fitted curve. From $F_T$ determined in this experimental manner, the altitude of the tropopause $A_T$ is found by reference back to the curves of FIG. 5. In FIG. 5, the response function $R_{AT}$ marked by dashed lines corresponds to the minimum power level, and its peak occurs at the tropopause altitude $A_T$ (or, equivalently, at a pressure associated with $A_T$, as discussed previously).

The tropopause temperature $T_T$ is determined from the measured data points of FIG. 6 by finding a temperature distribution $T_A$ (which is a function of the tropopause temperature $T_T$) that provides the closest fit to the measured power data points of FIG. 6. The power $P_{Ci}$ calculated to be measured at the ith measurement point corresponding to a particular measurement frequency $R_{Ai}$ is, by definition, $$P_{Ci} = \int [T_A \cdot R_{Ai}] dA$$

$T_A$ is the same (but initially unknown) for all of the measurement frequencies, and $R_{Ai}$ is the response curve from FIG. 5 for the ith measurement frequency. $T_A$ is that temperature distribution that minimizes the value of $(P-P_{Ci})$ for the measured data points of FIG. 6. In practice, it is found that determining the minimum difference solution by conventional techniques for five measured power data points is sufficient to establish $T_A$. $T_T$ is the minimum value of the curve $T_A$.

The present approach provides a technique for finding the altitude and temperature of the tropopause by a microwave remote sensing technique to an accuracy of a few hundred feet in altitude and less than 1° K in temperature. Studies have determined that each power measurement at a selected frequency can be accomplished in about 200 milliseconds with a temperature error noise of about 0.2° K using a measurement system such as that depicted in FIGS. 2 and 3. By operating the measurement system in an orbiting spacecraft, a map of the tropopause altitude and temperature is developed over a wide range of the earth's surface in an efficient manner.

Although a particular embodiment of the invention has been described in detail for purposes of illustration, various modifications and enhancements may be made without departing from the spirit and scope of the invention. Accordingly, the invention is not to be limited except as by the appended claims.

What is claimed is:

1. An apparatus, comprising:
   a variable frequency microwave radiometer operating over a range of from about 118.0 to about 119.0 GHz, the radiometer receiving as a first input a microwave signal and as a second input a frequency selector signal, and producing as an output a measured power level at a measurement frequency corresponding to the input frequency selector signal; and
   a feedback controller having as an input the measured power level and producing as an output the frequency selector signal, the feedback controller being operable to vary the frequency selector signal to a target frequency so as to produce a minimum value in the measured power level.

2. The apparatus of claim 1, wherein the radiometer includes a microwave receiving antenna;

an amplifier that receives an output of the antenna;

means for filtering an output of the amplifier at the measurement frequency to produce a filtered output; and means for determining the power of the filtered output.

3. The apparatus of claim 2, further including means for directing the microwave receiving antenna downwardly through the atmosphere of the earth.

4. The apparatus of claim 1, wherein the apparatus further includes an earth-orbiting platform upon which the radiometer is mounted.

5. The apparatus of claim 1, further including means for determining a tropopause equivalent altitude from the target frequency.

6. An apparatus, comprising:

a variable frequency microwave radiometer operating over a range of from about 118.0 to about 119.0 GHz, the radiometer receiving as a first input a microwave signal and as a second input a frequency selector signal, and producing as an output a measured power level at a measurement frequency corresponding to the input frequency selector signal, the radiometer including a microwave receiving antenna; and feedback controller means for varying the frequency selector signal to a target frequency within the range of from about 118.0 to about 119.0 GHz, so as to produce a minimum value in the measured power level at the target frequency.

7. A method for determining a tropopause equivalent altitude, comprising the steps of:

measuring the radiated power of a volume of the earth's atmosphere in a region containing the tropopause, at a measurement frequency within the range of from about 118.0 to about 119.0 GHz;

varying the measurement frequency so as to determine the measurement frequency within the range of from about 118.0 to about 119.0 GHz at which the radiated power is a minimum value, the measurement frequency at which the radiated power is a minimum being the target frequency; and determining a tropopause equivalent altitude from the target frequency.

8. The method of claim 7, wherein the step of measuring includes the step of providing a radiometer comprising a microwave receiving antenna;

an amplifier that receives an output of the antenna;

means for filtering an output of the amplifier at the measurement frequency to produce a filtered output; and means for determining the power of the filtered output.

9. The method of claim 8, further including the additional step of directing the microwave receiving antenna downwardly through the atmosphere of the earth.

10. The method of claim 7, further including the additional step of providing the radiometer on an earth-orbiting platform.

11. The method of claim 7, including an additional step of measuring a plurality of radiated power values at a plurality of frequencies within the range of from about 118.0 to about 119.0 GHz; and determining the tropopause temperature from the tropopause equivalent altitude and the plurality of radiated power values.

12. The apparatus of claim 6, wherein the radiometer includes a microwave receiving antenna;

an amplifier that receives an output of the antenna;

means for filtering an output of the amplifier at the measurement frequency to produce a filtered output; and means for determining the power of the filtered output.

13. The apparatus of claim 12, further including means for directing the microwave receiving antenna downwardly through the atmosphere of the earth.

14. The apparatus of claim 6, wherein the apparatus further includes an earth-orbiting platform upon which the radiometer is mounted.

15. The apparatus of claim 6, further including means for determining a tropopause equivalent altitude from the target frequency.

* * * * *